US007213201B2

(12) United States Patent
Brown et al.

(10) Patent No.: US 7,213,201 B2
(45) Date of Patent: May 1, 2007

(54) META EDITOR FOR STRUCTURED DOCUMENTS

(75) Inventors: Jason M. Brown, Durham, NC (US); Malcolm H. M. Holloway, Durham, NC (US); Christopher J. Schaubach, Cary, NC (US); Lisa M. Wood, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/378,214

(22) Filed: Mar. 3, 2003

(65) Prior Publication Data

US 2004/0177321 A1 Sep. 9, 2004

(51) Int. Cl.
*G06F 15/00* (2006.01)
*G06F 17/00* (2006.01)

(52) U.S. Cl. .................. 715/513; 715/501.1; 715/521; 715/522; 715/523

(58) Field of Classification Search ............ 715/501.1, 715/513–526
See application file for complete search history.

(56) References Cited

U.S. PATENT DOCUMENTS 5,966,123 A 10/1999 Kaplan
6,167,448 A 12/2000 Hemphill et al.
6,215,489 B1 4/2001 Kaplan
6,404,445 B1 6/2002 Galea et al.
6,829,745 B2 12/2004 Yassin et al.
6,941,510 B1 9/2005 Ozzie et al.
2001/0032218 A1* 10/2001 Huang ........................ 707/513
2006/0026505 A1* 2/2006 Mani et al. ................ 715/513

FOREIGN PATENT DOCUMENTS

WO WO 94/14122 * 6/1994

OTHER PUBLICATIONS

Klarlund et al., DSD: A schema language for XML, Aug. 2000, Proceedings of the third workshop on Formal methods in software practice FMSP '00, ACM Press, pp. 101-111.*

(Continued)

*Primary Examiner*—William Bashore
(74) *Attorney, Agent, or Firm*—Marcia L. Doubet

(57) ABSTRACT

Methods, systems, computer program products, and methods of doing business by using a meta-editor to generate components (e.g., a specification of a rules language that restricts editing operations on structured documents, a specification of rules according to this language, and a graphical user interface editor that operates according to the specified rules) for use in controlling or restricting the changes that can be made to contents of a structured document (e.g., a document encoded in the Extensible Markup Language, or "XML"). A Document Type Definition ("DTD") is generated as a "bounding DTD", based on editing choices made using the meta editor, and one or more structured documents containing editing restrictions are generated according to this DTD and these editing choices. An editor (or editing component) is generated that programmatically determines which elements of another structured document can be edited, which elements should be hidden, and so forth. By restricting the parts of the file that can be edited, users who need to do the editing are shielded from irrelevant details, and can carry out their task with less risk of making errors (and without needing to understand the details of the structured document markup language).

32 Claims, 14 Drawing Sheets

OTHER PUBLICATIONS

Feng et al., A semantic network-based design methodology for XML documents, Oct. 2002, ACM Transactions on Information Systems (TOIS), vol. 20 Issue 4, ACM Press, pp. 390-421.*

"IBM Tivoli NetView for z/OS V5.1: Addressing the Challenges of End-to-End TCP/IP Management", Mar. 5, 2002, IBM United States Software Announcement 202-051, Jan. 29, 2003, <http://www2.ibmlink.ibm.com/> (p. 5 of 36).

Sauer, Frank. "XMLTalk: A framework automatic GUI rendering from XML specs", Java Report, Oct. 2001 (p. 16-23).

"Xeena", Mar. 8, 1999, AlphaWorks, IBM, Jul. 8, 2002, <http://www.alphaworks.ibm.com/tech/xeena> (p. 1-2 of 3).

Ball, Steve. "A Very Swish XML Editor", Zveno Pty. Ltd., Jul. 7, 2002, <http://www.zveno.com/papers/XMLAP2K/paper.html> (p. 1-11).

Piez, Wendell. "Re: DTD Files!", May 9, 2000, BIGLIST Inc., Jul. 8, 2002, <http://www.biglist.com/lists/xsl-list/archives/200005/msg00353.html> (p. 1-2).

Klapsing, Reinhold et al. "An eXtensible Web Modeling Framework", University of Essen, Germany, Mar. 5, 1999 (p. 1-4).

* cited by examiner

```
410 <!ELEMENT sample-page-chars (header, body, footer) >

420 <!ELEMENT header (font, bg-color) >
430 <!ELEMENT body (bg-color) >
440 <!ELEMENT footer (font, bg-color, image) >

450 <!ELEMENT font PCDATA>
460 <!ELEMENT bg-color PCDATA>
470 <!ELEMENT image EMPTY>

480 <!ATTLIST image src CDATA #REQUIRED>
```

```
  <xml>
510 <sample-page-chars>
  515 <header>
    520 <font></font>
    525 <bg-color></bg-color>
      </header>
  530 <body>
        <bg-color></bg-color>
      </body>
      <footer>
        <font></font>
        <bg-color><bg-color>
    540 <image src="..."/>
      </footer>
    </samplepage-chars>
  </xml>
```

```
705 <!ELEMENT bounds (non-editable?, hidden? ) >

710 <!ELEMENT non-editable (sample-page-chars? ) >
715 <!ELEMENT hidden (sample-page-chars?) >

720 <!ELEMENT sample-page-chars (header?, body?, footer?)>

725 <!ELEMENT header (font?, bg-color?)>
730 <!ELEMENT body (bg-color?)>
735 <!ELEMENT footer (font?, bg-color?, image?)>

740 <!ELEMENT font EMPTY>
745 <!ELEMENT bg-color EMPTY>
750 <!ELEMENT image EMPTY>
```

```
<bounds>
        <non-editable>
            <sample-page-chars>
                <header>
810                 <font/>
                </header>
            </sample-page-chars>
        </non-editable>
        <hidden>
            <sample-page-chars>
                <footer>
820                 <image/>
                </footer>
            </sample-page-chars>
        </hidden>
</bounds>
```

950

Please customize your XML file.

Please provide a value for:      FYI:

For the sample-page-chars,
In the header:
    the font:
    the bg-color:
In the body:
    the bg-color:
In the footer:
    the font:
    the bg-color:

```
<xml>
    <sample-page-chars>
        <header>
            <font>Courier-12</font>
            <bg-color>blue</bg-color>
        </header>
        <body>
            <bg-color>white</bg-color>
        </body>
        <footer>
            <font>Times New Roman 8</font>
            <bg-color>gray<bg-color>
1320        <image src="www.ibm.com/myImages/footerImage.jpg"/>
        </footer>
    </samplepage-chars>
</xml>
```

1322

Please select editing restrictions.

|  | HIDE | NON-EDIT |
|---|---|---|
| <sample-page-chars> | ☐ | ☐ |
|   <header> | ☐ | ☐ |
|     <font> | ☐ | ☑ |
|     <bg-color> | ☐ | ☐ |
|   <body> | | |
|     <bg-color> | ☐ | ☐ |
|   <footer> | ☐ | ☐ |
|     <font> | ☐ | ☐ |
|     <bg-color> | ☐ | |
|     <image src="..footerImage.jpg"> | ☑ | ☐ |

```
705  <!ELEMENT bounds (non-editable?, hidden? ) >

710  <!ELEMENT non-editable (sample-page-chars? ) >
715  <!ELEMENT hidden (sample-page-chars?) >

720  <!ELEMENT sample-page-chars (header?, body?, footer?)>

725  <!ELEMENT header (font?, bg-color?)>
730  <!ELEMENT body (bg-color?)>
735  <!ELEMENT footer (font?, bg-color?, image?)>

740  <!ELEMENT font EMPTY>
745  <!ELEMENT bg-color EMPTY>
750  <!ELEMENT image EMPTY>

1560 <!ATTLIST image src CDATA>
```

```
<bounds>
    <non-editable>
        <sample-page-chars>
            <header>
                <font/>
            </header>
        </sample-page-chars>
    </non-editable>
    <hidden>
        <sample-page-chars>
            <footer>
  1630          <image src="www.ibm.com/myImages/footerImage.jpg"/>
            </footer>
        </sample-page-chars>
    </hidden>
</bounds>
```

META EDITOR FOR STRUCTURED DOCUMENTS

BACKGROUND OF THE INVENTION

Related Invention

The present invention is related to commonly-assigned U.S. patent Ser. No. 10/378,220, titled "Structured Document Bounding Language" (hereinafter, "the related invention"), which was filed concurrently herewith and is hereby incorporated herein by reference.

Field of the Invention

The present invention relates to computer software, and deals more particularly with methods, systems, computer program products, and methods of doing business by using a meta editor to generate components (e.g., a specification of a rules language that restricts editing operations on structured documents, a specification of rules according to this language, and a graphical user interface editor that operates according to the specified rules) for use in controlling or restricting the changes that can be made to contents of a structured document (e.g., a document encoded in the Extensible Markup Language, or "XML").

Reservation of Copyright

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

Description of the Related Art

XML is a derivative of the Standard Generalized Markup Language, or "SGML", and is considered the primary publishing language of the Web. XML is a simplified version of SGML, tailored to structured Web document content. XML is an "extensible" markup language in that it provides users the capability to define their own tags. This makes XML a very powerful language that enables users to easily define a data model, which may change from one document to another. When an application generates the XML markup tags (and corresponding data) for a document according to a particular XML data model and transmits that document to another application that also understands this data model, the XML notation functions as a conduit, enabling a smooth transfer of information from one application to the other. By parsing the tags of the data model from the received document, the receiving application can re-create the information for display, printing, or other processing, as the generating application intended it.

A Document Type Definition ("DTD") defines the structure of a document encoded in SGML, or in its derivatives such as XML. (For ease of reference, subsequent discussions herein refer to the XML notation in particular. However, this is for purposes of illustration and not of limitation. The discussions herein may be applied also to other structured markup languages that use DTDs or similar mechanisms for validation.) An XML parser processes an XML DTD along with a document encoded in XML to validate the document (e.g., to ensure that the document adheres to the data model defined by the DTD).

Because of its power and flexibility, XML is used in many diverse ways. While the term "document" is used herein when discussing encodings of XML, it is to be understood that the information represented using XML may comprise any type of information, and is not limited to the traditional interpretation of the word "document". For example, XML may be used to represent the layout of records in a data repository, the layout of a user interface for an application program, or the data to be used with a program or to be used as the values of records in a repository. For ease of reference, the term "document" (or simply "XML file") will be used herein to refer to these diverse types of information.

One of the many ways in which XML may be used is to specify configuration parameters and configuration data to be used by an executing application. In such scenarios, it may be necessary for a human user (such as a systems administrator) to edit an XML document, for example to customize the document for a particular installation. This customization might include providing information for initially setting up the proper execution environment, or specifying information pertaining to the setting of user preferences or other enterprise-specific customization, and so forth. For example, to set up the execution environment, it might be necessary to provide various path names and/or file names at one or more locations within an XML document that has been provided for use with an application. As an example of setting user preferences by editing an XML document, the document might contain syntax for setting the background or text color of graphical user interface ("GUI") panels; the user might then edit the XML document to specify a particular color. An enterprise-specific customization might include editing an XML document to specify the name and/or location of a graphic image (such as a company logo) that this enterprise wishes to display on its GUI panels.

Many more examples of customizing an XML document by editing its contents may be imagined. Furthermore, there may be other motivations for editing XML documents and for restricting the edits (e.g., due to security concerns), and the references herein to customization should therefore be viewed as illustrative but not as limiting the present invention.

Often, the file that a user is asked to edit contains many more XML tags (and much more data) than he needs to be exposed to. For example, the XML file that a user must edit may be defined by an industry standard DTD that might have dozens of tags and tag attributes. In such a case, the user may only need to edit a very small portion of the file, but is exposed to many details that don't concern him. Sometimes, the user can put the application in an unstable state by editing the XML file incorrectly.

There are several ways that are currently available for someone to edit XML. Three of the most common are: (1) using any ASCII text editor; (2) using one of the many GUI editors that support XML markup tags; (3) or using a customized GUI program provided especially for editing a particular XML file (or files).

Using an ASCII editor gives the average user no benefit: if the user is not experienced with XML, he is very likely to be confused or make mistakes. Accidentally deleting a character from the tag syntax, for example, will make the file invalid, and the inexperienced user may have difficulty in correcting simple problems of this type.

There are several GUI editors on the market that support XML markup tags, but these generally do not provide users with much more benefit than the ASCII editors. That is, the user is still required to understand XML in order to avoid making mistakes—although the GUI editor may make it easier to locate and correct simple mistakes, through its knowledge of valid XML syntax.

In both the ASCII and GUI XML editor scenarios, the fact remains that the user is exposed to the entire file being edited, even though he may only be concerned with a fraction of the data. This may add significantly to the user's confusion and the possibility for making mistakes. Furthermore, there may be parts of the data that the user should not be changing, and the ASCII and GUI XML editor scenarios are not able to provide "selective" file editing capability.

A customized GUI program provided especially for editing a particular XML file is the best way for a user to edit XML; however, it can be extremely expensive for an application development team to provide such a customized program that will meet the needs of a diverse set of users.

Accordingly, what is needed is a cost-effective way to enable users to edit XML files (or files encoded in other markup languages), while shielding them from details of the XML language (e.g., the tags and attributes of a particular data model) and at the same time, enabling application developers to have some control over what the users can do when they are editing XML files.

SUMMARY OF THE INVENTION

An object of the present invention is to provide cost-effective techniques to enable users to edit structured document files, such as XML files.

Another object of the present invention is to provide these techniques in a manner that shields users from details of the markup language used for encoding the structured document file.

Yet another object of the present invention is to provide techniques that enable application developers to have some control over what users can do when editing a structured document file.

A further object of the present invention is to provide techniques for generating components for use in enforcing restrictions specified in a bounding language to restrict the changes that can be made to contents of a structured document.

Still another object of the present invention is to define techniques for providing a meta editor for generating components for use in enforcing restrictions specified in a bounding language.

Another object of the present invention is to define techniques for generating a specification of a rules language that restricts editing operations on structured documents, a specification of rules according to this language, and/or a graphical user interface editor that operates according to the specified rules.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides software-implemented methods, systems, and computer program products for generating components to control manipulation of structured document content. In preferred embodiments, this technique comprises: determining, from a provided structured markup language definition document, allowable syntax for structured documents adhering to the structured markup language definition document; displaying the determined syntax to a first user, along with one or more selectable editing restrictions to be applied to a particular one of the structured documents; and generating at least one component to enforce restrictions selected by the first user when one or more other users attempt to edit the particular one of the structured documents. The technique may also comprise selecting, by the first user, one or more of the selectable editing restrictions for the displayed syntax, prior to generating the at least one component.

The first structured markup language definition document may be a DTD document, and the particular structured document may be encoded in XML.

The generating may further comprise generating a second structured markup language definition document that correlates to the provided structured markup language definition document and which identifies the selectable editing restrictions, in which case the generated correlation preferably further comprises programmatically copying tags from the allowable syntax to the second structured markup language definition document.

The particular one is preferably encoded in a first structured markup language, and the generating may further comprise generating a bounding document, encoded in the first structured markup language, that specifies the selected restrictions. In this case, the generating preferably further comprises generating a second structured markup language definition document that correlates to the provided structured markup language definition document and which identifies the selectable editing restrictions, wherein the generated bounding document adheres to the generated second structured markup language definition document.

The generating may further comprise generating an editing capability for the other users to use when editing the particular one, in which case the technique may further comprise editing, by one of the other users, the particular one, using the generated editing capability, wherein the generated editing capability constrains the editing according to the selected restrictions.

Alternatively, the generating may further comprise: generating a second structured markup language definition document that correlates to the provided structured markup language definition document and which identifies the selectable editing restrictions; generating a bounding document, encoded in the first structured markup language, that specifies the selected restrictions that adheres to the generated second structured markup language definition document; and generating an editing capability for the other users to use when editing the particular one.

The disclosed techniques may also be used advantageously in methods of doing business, whereby a service is offered to clients for (1) programmatically generating one or more XML bounding files to control changes to be made when users edit selected files; (2) programmatically generating one or more bounding DTDs; (3) programmatically generating an editing capability (referred to hereinafter as an "editor" for ease of reference, even though the generated editing capability may be incorporated within another editing component) that may correspond to a particular XML bounding file (or which may operate in a generic manner with one of a plurality of XML bounding files); and/or (4) deploying the editing capability to enforce controls on user editing operations according to an XML bounding file. This service may be provided under various revenue models, such as pay-per-use billing, monthly or other periodic billing, and so forth, and may offer clients advantages of improved accuracy for XML file editing and reduced debugging time caused by inaccurate editing.

The present invention will now be described with reference to the following drawings, in which like reference numbers denote the same element throughout.

BRIEF DESCRIPTION OF THE DRAWINGS

FIG. 4 shows a sample DTD that might be provided as input to an embodiment of the present invention;

FIG. 5 shows a skeleton XML file that adheres to the DTD in FIG. 4, and which may be "implied" as an input in the component configuration illustrated in FIG. 3A;

FIG. 7 shows a "bounding DTD" that may be generated by an embodiment of the present invention and which defines allowable syntax for specifying "bounds" on how files created according to the sample DTD in FIG. 4 can be edited;

FIG. 8 depicts a sample "XML bounding file" that may be generated by an embodiment of the present invention, and which adheres to the bounding DTD in FIG. 7 and specifies a particular set of restrictions or bounds on editing a file created according to the sample DTD in FIG. 4;

FIG. 13 shows a sample XML file which is a filled-in version of the skeleton in FIG. 5, and which adheres to the DTD in FIG. 4 and may be provided as an input in the component configuration illustrated in FIG. 3B;

FIG. 15 illustrates how the bounding DTD file in FIG. 7 may be changed when using the example scenario of FIGS. 13 and 14; and FIG. 16 provides an XML bounding file corresponding to the example scenario in FIGS. 13 and 14.

DESCRIPTION OF PREFERRED EMBODIMENTS

Figure 1:
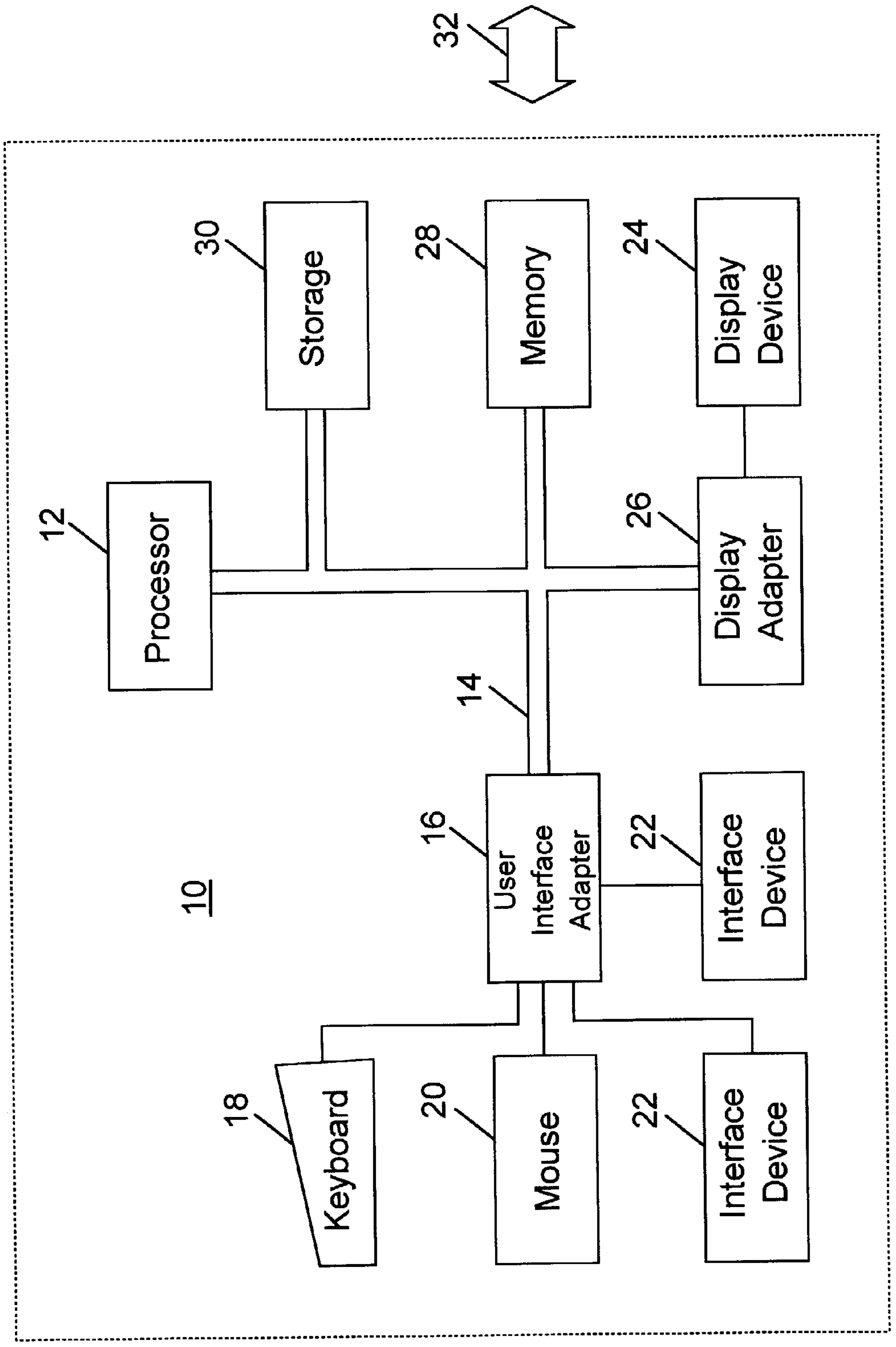
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a cellular digital packet data ("CDPD") card. The workstation 10 may be associated with such other computers in a local area network ("LAN") or a wide area network ("WAN"), or the workstation 10 can be a client in a client/server arrangement with another computer, etc. All of these configurations, as well as the appropriate communications hardware and software, are known in the art.

Figure 2:
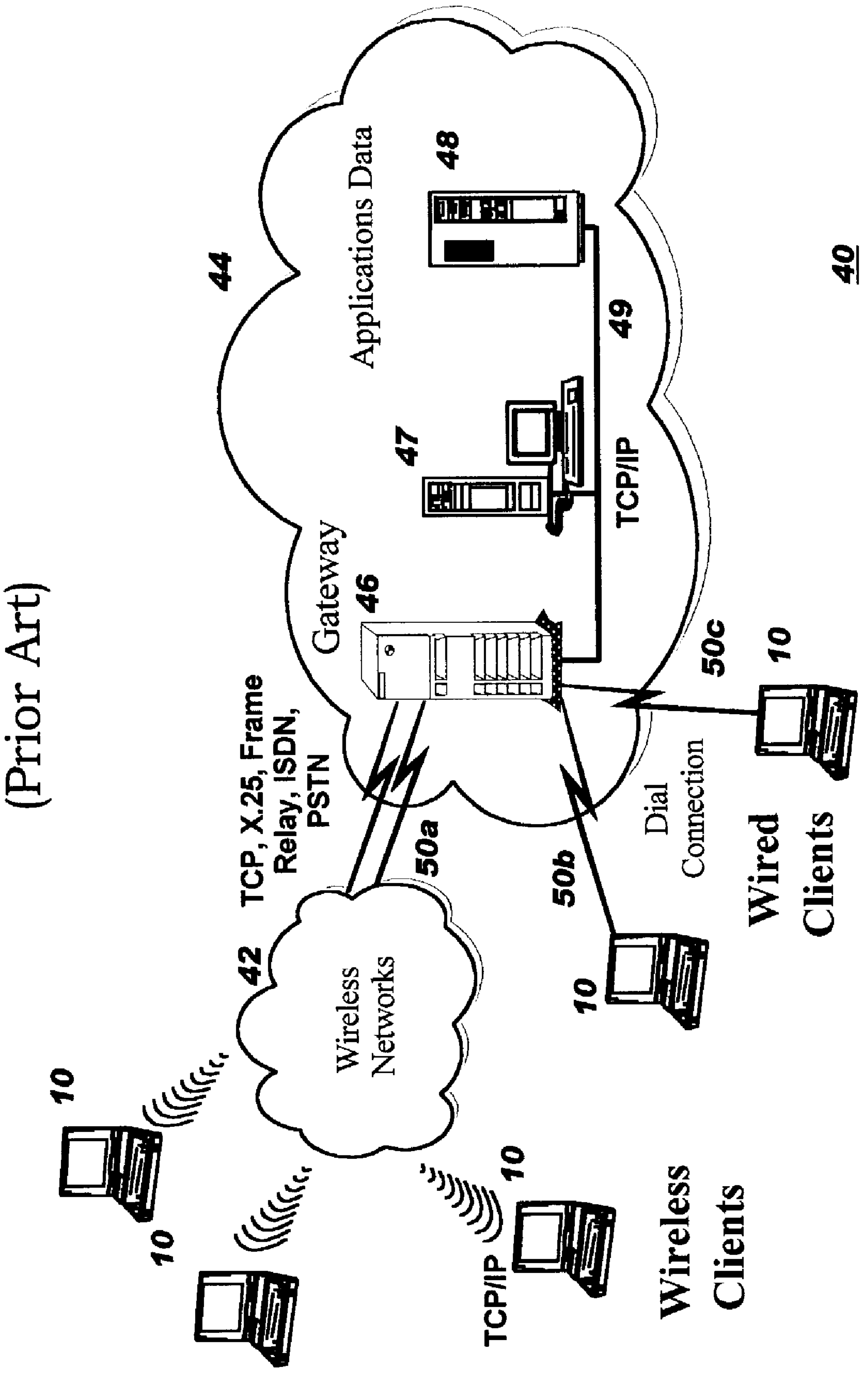
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50*a*. The gateway 46 may also be directly coupled to one or more workstations 10 using a communications link 50*b*, 50*c*. The gateway computer 46 may be implemented utilizing an Enterprise Systems Architecture/370™ available from the International Business Machines Corporation ("IBM®"), an Enterprise Systems Architecture/390® computer, etc. Depending on the application, a midrange computer, such as an Application System/400® (also known as an AS/400®) may be employed. ("Enterprise Systems Architecture/370" is a trademark of IBM; "IBM", "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in Florida. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50*a* such as TCP or User Datagram Protocol ("UDP") over IP, X.25, Frame Relay, Integrated Services Digital Network ("ISDN"), Public Switched Telephone Network ("PSTN"), etc. The workstations 10 may alternatively connect directly to the gateway 46 using dial connections 50*b* or 50*c*. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems (and their users). Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The computing environment in which the present invention may be used includes an Internet environment, an intranet environment, an extranet environment, or any other type of networking environment. These environments may be structured in various ways, including a client-server architecture or a multi-tiered architecture. The present invention may also be used in a disconnected (i.e. stand-alone) mode, for example where a developer generates components for restricting user editing operations on a workstation, server, or other computing device without communicating across a computing network (and where these generated components may then optionally be transmitted in a networking environment, or may be transmitted on media such as diskettes, and so forth).

When used in a networking environment, a user of the present invention (e.g., a developer or other person responsible for determining how editing operations should be restricted, referred to herein as a "developer" for ease of reference) may connect his computer to a server using a wireline connection or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The developer's computer may be any type of computer processor, including laptop, handheld, or mobile computers; vehicle-mounted devices; desktop computers; mainframe computers; personal digital assistants ("PDAs"); Web-enabled cellular phones; Web appliances; wearable computing devices; so-called "smart" appliances in the home; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, developer's computer will be referred to equivalently as a "workstation", "device", or "computer", and use of any of these terms or the term "server" refers to any of the types of computing devices described above.

It should be noted that discussions herein refer to the primary intended audience of the present invention as being developers, although this is by way of illustration and not of limitation, where these developers use the present invention to generate components that are targeted for eventual use by end users. The term "end user" is used hereinafter to refer to a user of the output(s) of the present invention, as distinguished from the developer who uses the present invention to create these output(s). Note also that these "end users" may, in some scenarios, be developers (who may, for example, use the generated output of the present invention to more easily and accurately edit structured documents).

In the preferred embodiment, the present invention is implemented as one or more computer software programs. The software may operate on a server in a network, as one or more modules (also referred to as code subroutines, or "objects" in object-oriented programming) which are invoked upon request. Alternatively, the software may operate on a developer's workstation. The server may be functioning as a Web server, where that Web server provides services in response to requests from a client connected through the Internet. Alternatively, the server may be in a corporate intranet or extranet of which the client's workstation is a component, or in any other networking environment.

The present invention enables application developers to use their domain-specific or application-specific knowledge to bound end-user actions when end users are editing XML files. The related invention discloses techniques for using a bounding DTD to specify a bounding language, and providing one or more bounding files created according to this bounding DTD, to control or restrict the changes that can be made to contents of a structured document, such as a document encoded in XML. The present invention discloses techniques for automating generation of the bounding DTD and bounding file(s), and for programmatically generating an editor that corresponds to a particular bounding file. As will become obvious from descriptions of the present invention, below, the developer may generate more than one bounding DTD from a single input (i.e., an input DTD and, optionally, an input file to be bounded), and more than one bounding file corresponding to this bounding DTD; however, this is not required, and generation of a single bounding DTD and a single bounding file is within the scope of the present invention.

As disclosed in the related invention, a bounding DTD defines a bounding language, and one or more bounding files may be created according to the language defined in this bounding DTD, where each bounding file specifies a particular set of restrictions on editing an XML file. A bounding DTD correlates to the DTD for an XML file that is to be customized (i.e., edited) by end users. This bounding DTD contains elements that describe actions to take against defined elements of an XML file created according to the other DTD. These actions can include, but need not be limited to, "hide the element" (either hide the entire element or hide specified child elements); "make the element non-editable" (either the entire element is non-editable or specified child elements are non-editable); etc.

For example, a bounding file might specify that certain tags (including their data and the data of their child tags) are never editable, while another bounding file might specify that tags are non-editable only under certain conditions (such as the tag's attributes having particular values). The bounding files are also encoded in XML, in preferred embodiments of the present and related inventions, and are referred to equivalently herein as "XML bounding files". (The term "XML element" is used herein to refer to an XML tag and its data.)

Whereas the bounding DTDs and XML bounding files described in the related invention may be manually created by a developer, the present invention enables programmatic creation of these files. (As will be obvious, these programmatically-created files may also be used with embodiments of the related invention.)

The present invention programmatically generates a bounding DTD, an XML bounding file that adheres to the syntax restrictions of the bounding DTD and which therefore specifies restrictions on editing structured documents, and/or a GUI editor that enforces the restrictions specified in an XML bounding file (such as the generated XML bounding file). The generated GUI editor serves as the processing component described in the related invention. (As discussed briefly above, the present invention may, in some embodiments, generate a subset of a complete "editor", where this subset is responsible for enforcing editing restrictions as disclosed in the present and related inventions. For example, the present invention may generate code objects or subroutines that are invoked from existing editor functionality which provides prior art functions such as displaying UI panels and accepting end user input. Thus, references herein to generation of an "editor" are intended to include generation of such subsets of editor functionality.) When in use by an end user, the generated GUI editor of preferred embodiments reads in a generated XML bounding file and, based on its specified restrictions, provides a set of editing actions that limit the end user in what he can see and do with an XML element. This XML bounding file can then be changed, if desired, so that the editor acts differently, depending on the revised restrictions in the XML bounding file. These changes to the XML bounding file may be made manually (e.g., by a developer who edits the output of the present invention with some form of editor other than one generated as disclosed herein) or programmatically (e.g., by repeating execution of the present invention to define additional or different editing restrictions). Thus, editing operations available on the same XML source file (i.e., the input XML file for which end-user editing is to be bounded) can be tailored to different end users with diverse needs or different tasks as long as there is a different implementation of the XML bounding file.

As stated earlier, the programmatic component generation techniques disclosed herein enable controlling how end users edit structured documents. Preferred embodiments will be described with reference to generating components for use when editing files that contain information for setting up characteristics of a sample Web page. However, it should be apparent that generating components for use when editing files (and restricting edits) for other motivations and when editing other types of files are also within the scope of the present invention.

Note that the word "file" is used in this disclosure to refer to stored data. This is for ease of reference only, and is not meant to imply any particular structure for storing the data, such as conventional "flat files". The data with which the present invention may be beneficially used may be stored in any number of ways without deviating from the inventive concepts disclosed herein, such as: a data element in a database, an object attribute in a directory entry, an object in flash memory, etc.

Techniques are known in the art with which GUI editors allow XML files created according to a DTD to be edited (and validated). The Xeena editor, for example, parses a DTD to learn the syntax of documents adhering to that DTD, and then builds this knowledge into a visual, tree-directed editing paradigm where users are not allowed to define invalid XML files. Thus, if the DTD specifies allowable tags as <A>, <B>, and <C>, the user is not allowed to create a file with a tag <D>. The present invention, on the other hand, generates components that provide much finer-grained control over the editing process, using one DTD that correlates to another DTD, as will be described.

Preferred embodiments of the present invention will now be discussed in more detail with reference to FIGS. 3–16.

Figure 3A:
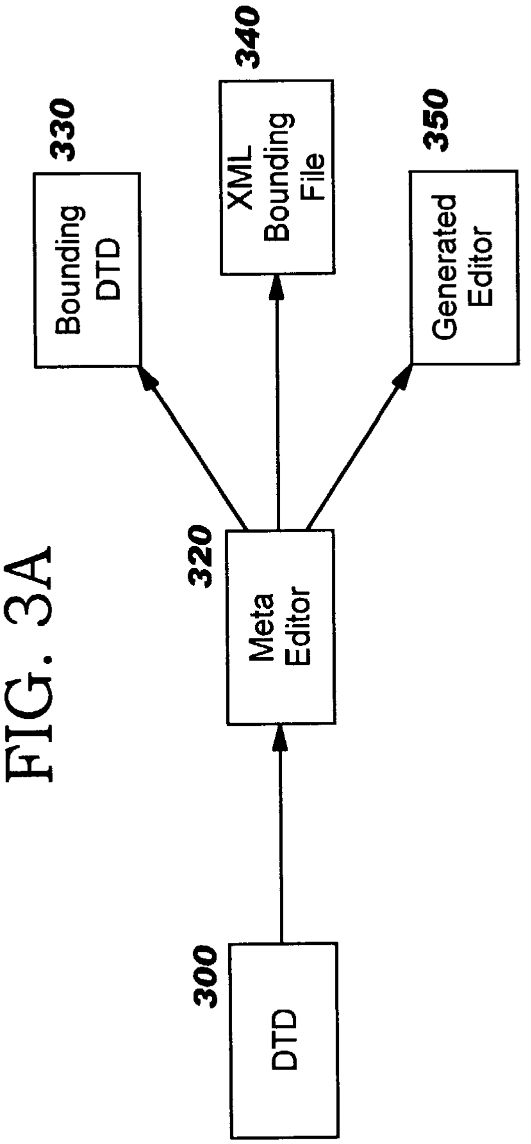
FIGS. 3A and 3B illustrate, at a high level, components used in two preferred embodiments of the present invention.
Figure 3B:
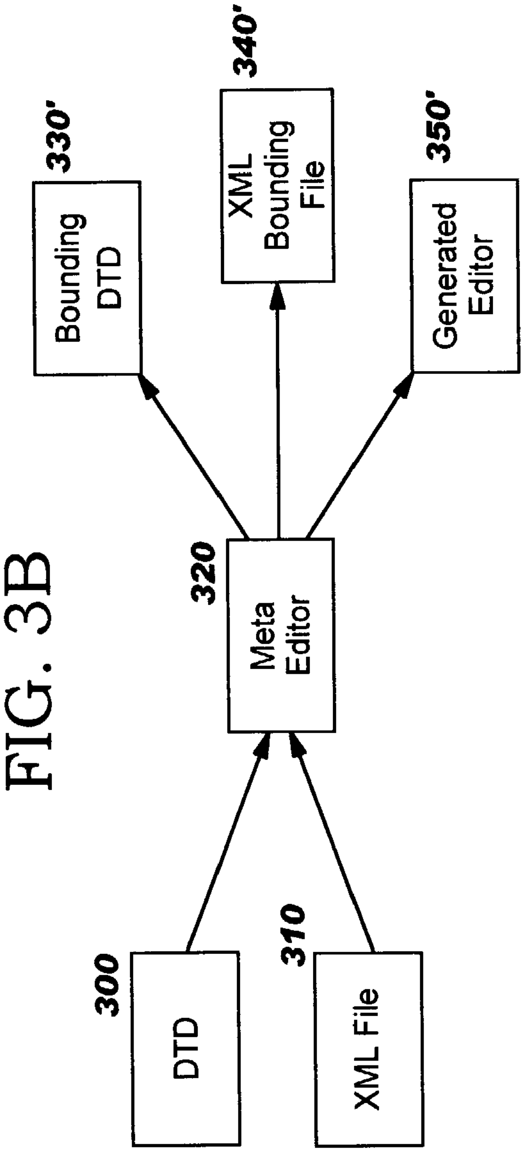

FIGS. 3A and 3B illustrate components used in two preferred embodiments. In the embodiment shown in FIG. 3A, a first DTD 300 is provided as input to the meta editor 320, where this DTD defines allowable syntax for writing structured documents.

The meta editor 320 of preferred embodiments of the present invention generates a bounding DTD 330, based on the language defined by the input DTD 300 and on input received from a developer who is using the meta editor. This bounding DTD is directed toward limiting the changes that can be made to an XML document to be bounded (not shown in FIG. 3A). The bounding DTD defines the allowable syntax for an XML bounding file 340, which is also generated by the meta editor 320 of preferred embodiments of the present invention. As stated earlier, embodiments of the present invention may generate more than one bounding DTD and XML bounding file for a particular input, which includes DTD 300 in the configuration shown in FIG. 3A and DTD 300 and XML file 310 in the configuration shown in FIG. 3B—for example, when the developer uses the same input multiple times but makes different choices of editing restrictions.

Referring now to FIG. 4, a sample DTD 400 that might be provided as input to an embodiment of the present invention will be described. As can be seen by inspection, this DTD 400 defines a language for "sample-page-chars"—i.e., sample page characteristics—where these characteristics comprise having a header, a body, and a footer. This DTD is intended to represent how a simple Web page document might be specified. The header is defined as having a font and a background color (i.e., "bg-color"); the body has only a background color; and the footer has a font, a background color, and an image (such as a company logo).

When the meta editor is used to generate components according to the configuration in FIG. 3A, there is no XML input file provided (in contrast to FIG. 3B, where an XML file 310 is provided as an input). However, the DTD may be considered as inherently describing a skeleton XML file, where this skeleton file includes every possible element defined in the DTD. Thus, the skeleton document 500 in FIG. 5 illustrates how such an implied input document for the DTD 400 would look. (Refer to FIGS. 13–16, below, for a discussion of how the meta editor 320 functions differently when an actual XML file 310 is provided according to the configuration of FIG. 3B.)

Figure 6:
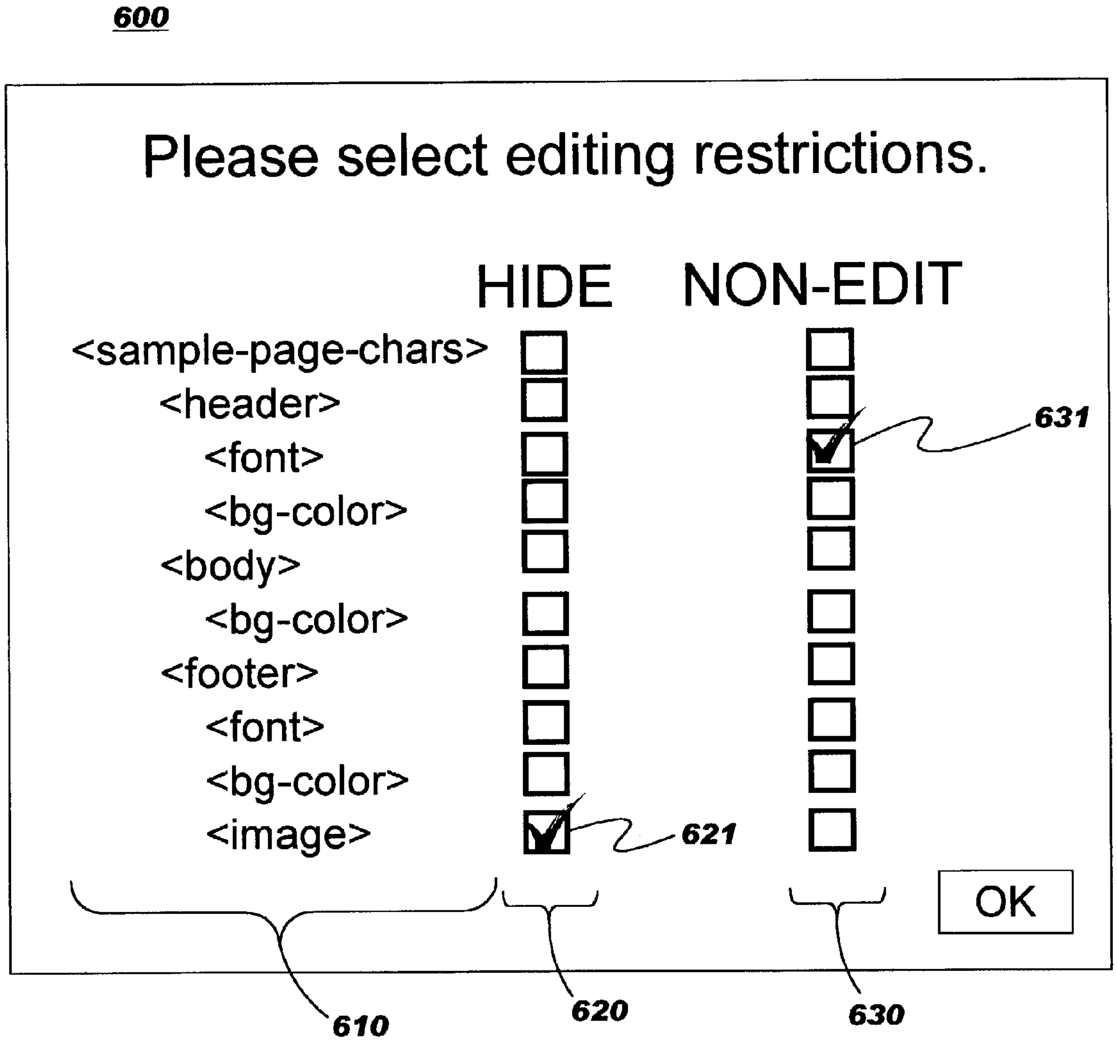
FIG. 6 depicts a simple illustration of a meta editor that may be used in an embodiment of the present invention.

FIG. 6 depicts a simple illustration of a meta editor that may be used in an embodiment of the present invention to enable a developer to specify editing restrictions. Portions of the meta editor are dynamically generated as well, such that it adapts dynamically to the developer's choice of input DTD (and input XML file, when operating according to FIG. 3B). FIG. 10, described below, provides logic which may be used for this dynamic generation. Thus, FIG. 6 shows that the tags from the input DTD 400 are presented on a GUI panel 600 as choices for the developer. See, generally, reference number 610. For purposes of illustration, the tags have been displayed in hierarchical tree representation, which may serve to remind the developer of the structure of target XML files (i.e., XML files to be bounded according to his selections). In this example panel 600, the developer is presented with two choices that he may select for bounding operations on any of the tagged elements. These choices are to hide selected ones of the elements or to make selected ones of the elements non-editable, as indicated by the columns of check-boxes 620 and 630, respectively. In the example of FIG. 6, the developer has chosen (as shown by the check marks 631, 621) to make the <font> element within the <header> element of the document non-editable, and to make the <image> element within the <footer> element hidden. (As will be obvious, the panel 600 might be structured in many alternative formats, and as discussed in the related invention, the developer might be allowed to select restrictions other than making elements hidden or non-editable.)

FIGS. 7–9 show representative examples of the output that may be generated in response to the developer's selections on panel 600. Each of these generated outputs will now be described in more detail.

The bounding DTD 700 in FIG. 7 indicates, at its highest level 705, that the developer may have selected elements to be marked as non-editable or hidden. (See the "bounds" element at the root of DTD 700, which optionally has a "non-editable" child element and a "hidden" child element.) Element definitions 710 and 715 indicate that, in either case, the defined restrictions apply—for this dynamically-specified input DTD 400—to a document having a <sample-page-chars> element at its highest level. See element definition 410 of DTD 400 and its corresponding element 510 in the skeleton XML file 500. As will be obvious, the allowable value specified on these element definitions 710, 715 will vary, and is programmatically determined, according to preferred embodiments, by parsing the input DTD 400.

Element definition 720 is also programmatically generated, based on parsing the input DTD 400 to determine what child elements comprise this DTD's highest-level element. Preferred embodiments allow the developer to optionally specify restrictions on any element, using his domain-specific knowledge. Thus, element 720 of the bounding DTD is created from element 410 of DTD 400 by programmatically inserting a "?" character (which, in standard DTD conventions, indicates "0 or 1 occurrence") following each child tag to indicate that bounds on each child are optional in a bounding file created according to this bounding DTD 700.

Similarly, an element definition is programmatically generated for each child element definition (exemplified by reference numbers 420–440) of the input DTD 400 by inserting a "?" following each child element therein, as shown at reference numbers 725–735.

For leaf element definitions in the input DTD, such as those at reference numbers 450–470, preferred embodiments programmatically generate "empty" element definitions; see reference numbers 740–750. As is known in the art, a DTD element definition containing the keyword EMPTY indicates a tag that has no child tags and cannot have a value.

Turning now to FIG. 8, the developer's selections from panel 600 have been used to programmatically generate XML bounding file 800. As explained in the related invention, a bounding file may be considered as embodying a set of rules, where these rules conform to the bounding DTD (in this case, bounding DTD 700 of FIG. 7) and specify how a document instance created according to a different DTD (in this case, DTD 400 of FIG. 4) can be edited.

Thus, XML bounding file 800 specifies a non-editable element 810 and a hidden element 820, since the developer selected at least one tag for each of these restrictions when using panel 600 of FIG. 6. The selection at 621, indicating that the <image> element within the <footer> element of the <sample-page-chars> document is to be hidden, is encoded in the XML bounding file 800 by specifying an empty <image/> tag, along with its parent tags, as can be seen by review of the syntax at 820. Similarly, the selection at 631, where the developer indicated that the <font> tag within the <header> element was to be non-editable, is encoded by specifying an empty <font/> tag along with its parent tags in the syntax at 810.

Figure 9A:
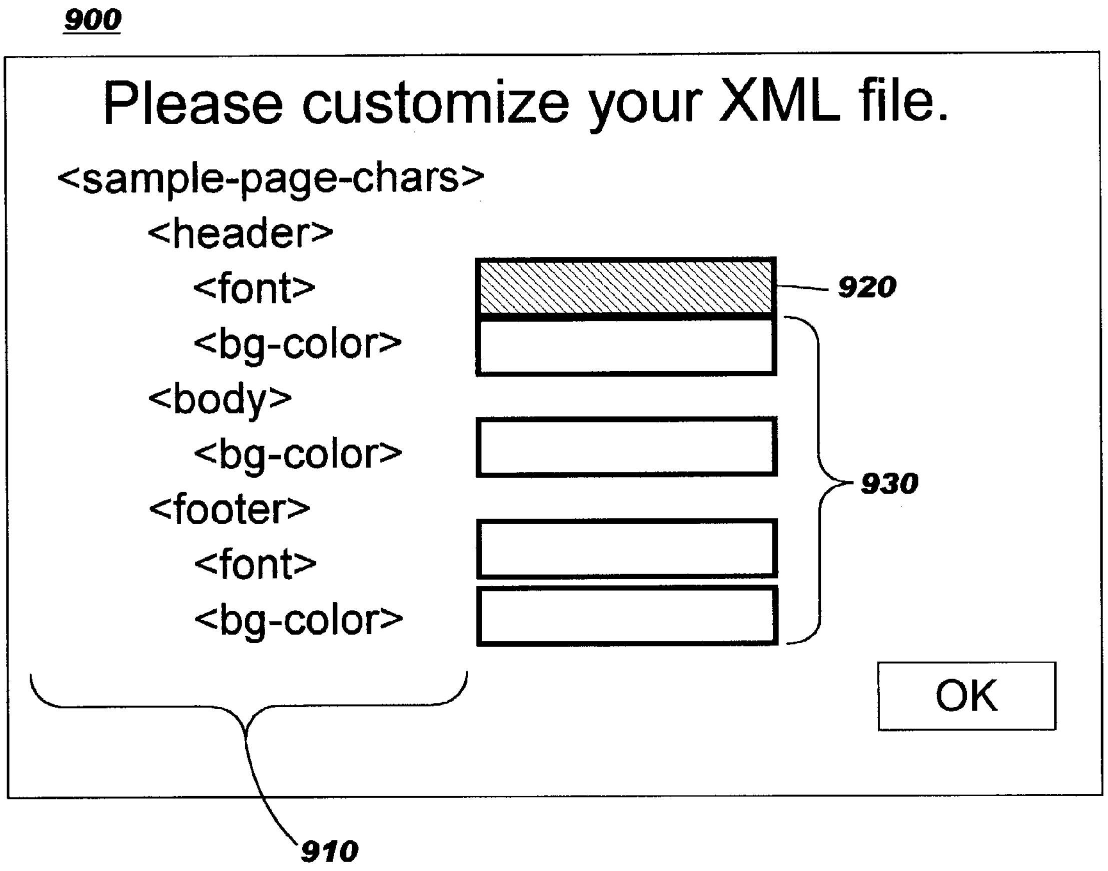
FIGS. 9A and 9B provide simple illustrations of an editor that may be generated by an embodiment of the present invention.
Figure 9B:
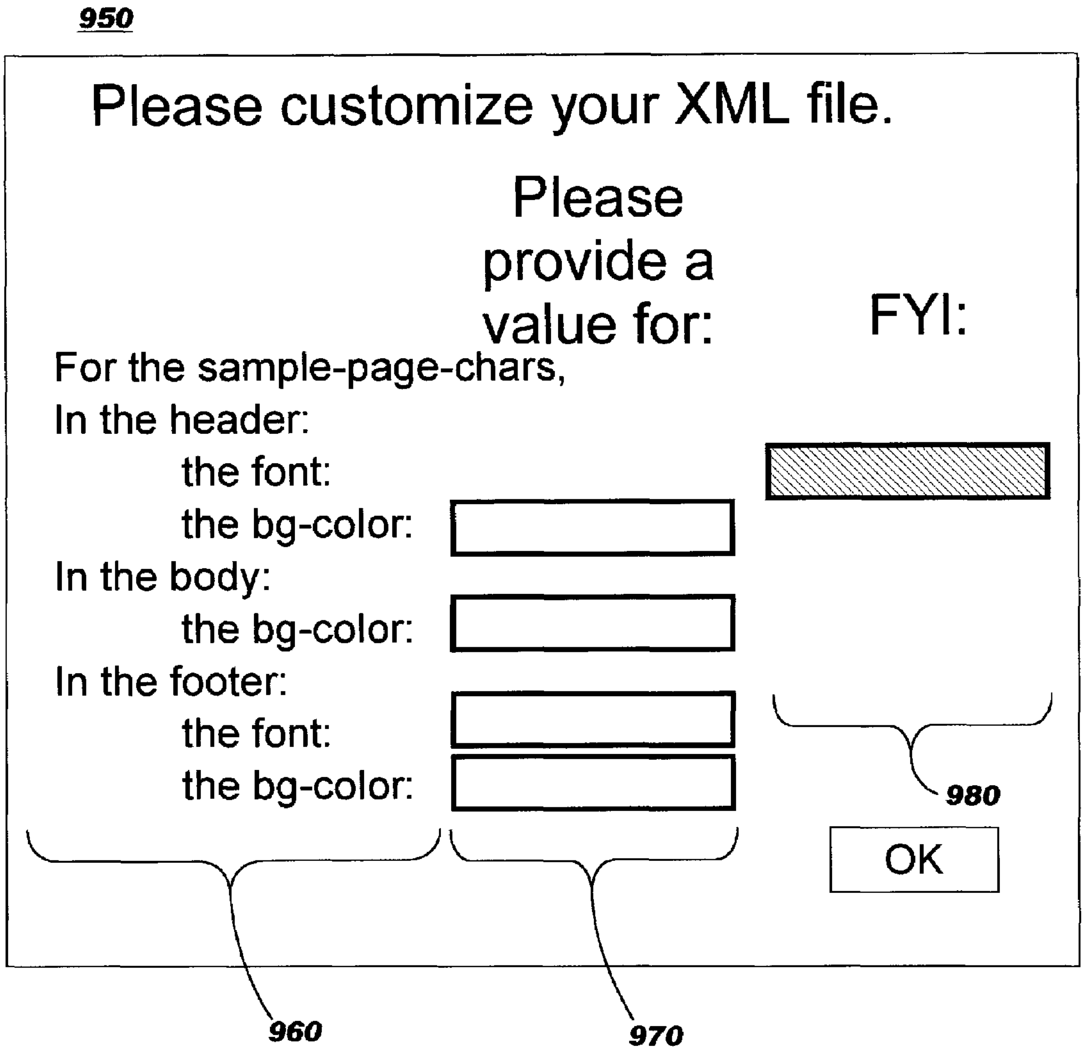

FIGS. 9A and 9B provide simple illustrations of an editor that may be generated by an embodiment of the present invention. In FIG. 9A, the dynamically-determined tag set from the input DTD 400 has been used to populate panel 900 of the generated GUI editor (see, generally, reference number 910), and the developer-selected restrictions that are encoded in the XML bounding file 800 are reflected on this panel by (1) indicating (by presence of shading, in this example) that <font> field 920 is display-only (i.e., non-editable); (2) indicating (by absence of shading, in this example) that the fields at 930 are editable; and (3) completely omitting display of (i.e., hiding) the <image> tag that would appear in an XML input file as shown at 540 of FIG. 5. Typically, the editable fields 930 will be displayed as text fields on an actual generated GUI; they have been distinguished using shading herein merely for drafting convenience.

FIG. 9B also uses the dynamically-determined tag set from the input DTD to populate panel 950 of an alternative version of the generated GUI. In this alternative version, the tags have been displayed in sentence-like form (see, generally, reference number 960), rather than using tag syntax (which may confuse some end users who will edit input with the generated GUI). In addition, the editable fields 970 have been displayed separately from the non-editable field 980.

The particular manner in which the generated GUI is laid out may vary widely without deviating from the scope of the present invention. For example, while a single panel 900, 950 suffices for the simple DTD 400 and its very limited set of tags, it may be advantageous to generate the GUI in an alternative layout style, such as using a wizard-like approach—where the end user will then deal with one element and its children (for example) on one panel before moving on to another panel to deal with a different element.

The meta editor panels may also be laid out in a wide variety of fashions without deviating from the scope of the present invention. While meta editor panel 600 only allowed the developer to check boxes corresponding to each tag of the input DTD, additional choices might allow him to specify things such as descriptive text to be supplied on the generated editor panel and/or help text to be made available therewith; which fields are to be displayed as text entry fields; and so forth. A wizard-like approach may be useful for the meta editor when dealing with an expanded number of choices such as this, and/or in cases where the input DTD may have a relatively large number of tags for which the developer will be asked to select restrictions.

According to techniques disclosed herein, an XML bounding language (such as that represented in DTD 700 of FIG. 7) can help developers easily control how users are allowed to manipulate XML data, in a very cost-effective manner. The developers simply use the meta editor to specify editing restrictions, and then generate an XML bounding file (such as that represented at 800 in FIG. 8) that sets out rules, according to the bounding DTD syntax (where preferred embodiments also generate the bounding DTD), for the data editing. Preferred embodiments also generate an editor that enforces the rules in the generated XML bounding file (as will be described in more detail with reference to FIG. 12). If the developers decide, at some point, that it would be desirable to control the manipulations in some other manner, or perhaps that they would like a different set of controls for a different user audience (for example, an audience that needs to perform different tasks with the XML file being bounded), the developers merely generate a different XML bounding file (e.g, using the meta editor, or perhaps using a text editor to edit an already-generated XML bounding file), and use this as input to the editor. The editing restrictions can therefore be changed by the developers in an easily-modifiable way, and the editing restrictions can be adapted for use by diverse sets of end users, each of which have slightly different needs, all without requiring re-compiling code.

Logic which may be used in implementing preferred embodiments will now be described with reference to the flowcharts in FIGS. 10–12.

Figures 10A, 10B:
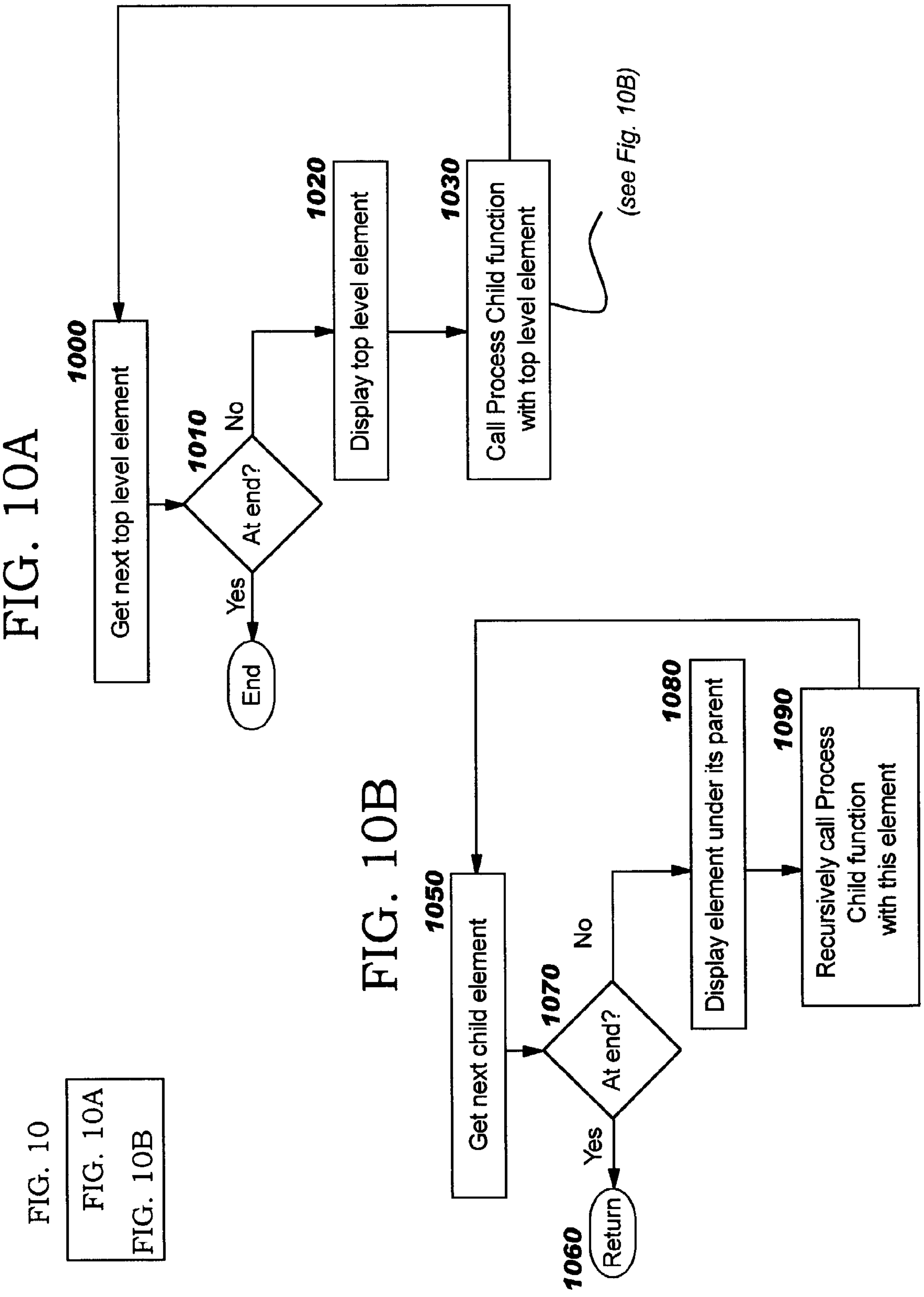
FIGS. 10–12 provide flow charts that set forth logic which may be used to implement a preferred embodiment of the present invention.

Referring first to FIGS. 10A and 10B, logic is depicted which may be used to dynamically populate the meta editor (such as meta editor 600 in FIG. 6) with the tags of the input DTD (such as DTD 400 of FIG. 4). Note that, according to the present invention, the DTD that will be processed (and which corresponds to the output components that will be generated) does not need to be known to the meta editor a priori, Instead, the meta editor dynamically learns the syntax of the DTD. The choices to be presented to the developer, however, such as "hide" and "non-edit" in FIG. 6, are known to the meta editor in advance. The meta-editor can therefore provide a proper implementation of these choices (e.g., in the resulting editor 350).

Beginning at Block 1000 of FIG. 10A, the next top-level element of the original DTD is obtained from the input DTD 300 (exemplified by DTD 400 in FIG. 4), and Block 1010 then checks to see if the DTD is at the end (i.e., if the processing of the DTD is complete). If so, then control exits from FIG. 10A, and the tags (and, in preferred embodiments, their hierarchical tree structure) are available for displaying on the meta editor panel. Otherwise, processing continues at Block 1020, which displays the obtained top-level element. (Note that this "display" may comprise, in some approaches, writing the element into a buffer or other storage repository for subsequent rendering to the end user, once a complete panel of information is available.) Block 1030 then invokes processing of this element's children, where this invoked processing is depicted in FIG. 10B. Once processing of the children is finished, control returns to Block 1000 to obtain and process the next top-level element.

In FIG. 10B, the child elements are processed recursively. Block 1050 obtains the next child element at the current hierarchical level, and Block 1070 checks to see if processing is now finished for all of the children of the top-level element for which FIG. 10B was invoked. If so, then control returns (Block 1060) to the invoking logic of FIG. 10A. Otherwise, processing continues at Block 1080, which displays this child element under its parent. As stated earlier, preferred embodiments indicate the hierarchical relationship among nodes of the DTD, and thus this child element is preferably indented under its parent. Block 1090 then recursively invokes the processing of FIG. 10B for this child element, such that all of its own children (and other descendants) will be processed as well.

Figure 11:
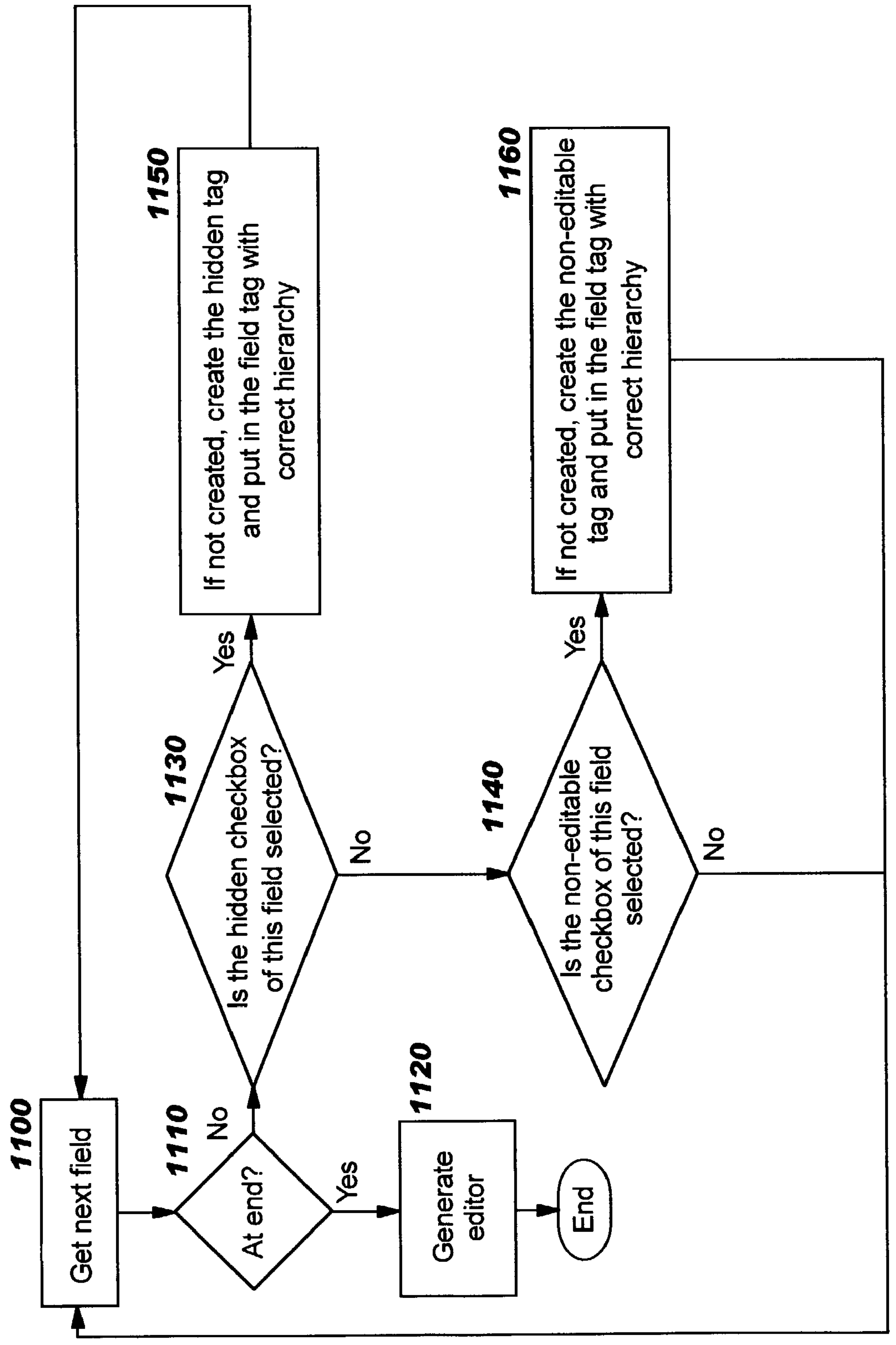

FIG. 11 illustrates logic that may be used to process the developer's chosen restrictions from the meta editor panel (or multiple panels or other similar display/selection means). Preferably, the tags that were displayed to the developer are processed in sequence, and the possible choices for each such tag are evaluated in turn. These tags and the developer's corresponding selections may have been stored, for example, as an array, list, table, or other structure; this structure is referred to hereinafter as an array for ease of reference. At Block 1100, the next field from the array of displayed tags is obtained. Block 1110 checks to see if the array of tags is at the end; if so, then generation of the XML bounding file is complete, and as shown at Block 1120, the GUI editor is then preferably generated. (It should be noted that embodiments of the present invention are not required to perform all operations, from parsing the input DTD to generation of the output GUI editor, in-line. For example, the developer's selections might be persistently stored after he processes the tags from the input DTD with the meta editor, and he may return later to generate an XML bounding file from these stored selections. He may choose to generate the GUI editor at a still later time, or at the time he generates the XML bounding file. Generation of the XML bounding file and/or GUI editor may, in some cases, be driven by a programmatic trigger rather than by the developer.)

When the test in Block 1110 has a negative result (i.e., processing of the array of tags is not yet finished), control reaches Block 1130, which tests to see if the "hidden" checkbox for this field was selected. If it was (for example, in the case of the <image> tag at 621 in FIG. 6), then Block 1150 ensures that the parent <hidden> tag pair (see reference number 820 in FIG. 8) is in the XML bounding file being created (and creates this tag pair if not) before inserting the current field's tag in that <hidden> element in the proper hierarchical position. Control then returns from Block 1150 to Block 1100 to begin processing the next field from the array. (Note that this approach prevents a hidden element from being marked as non-editable. This is a processing optimization.)

If the current field was not marked by the developer as being hidden, then control reaches Block 1140, which checks to see if the developer checked the "non-editable" box for this tag. If so, then Block 1160 ensures that the parent <non-editable> tag pair (see reference number 810 in FIG. 8) is in the XML bounding file being created (and creates this tag pair if not) before inserting the current field's tag in that <non-editable> element in the proper hierarchical position. Control then returns from Block 1160 to Block 1100 to begin processing the next field from the array.

Note that the processing of FIG. 11 needs to know the types of choices that were presented to the developer ("hide" and "non-edit", in the example of FIG. 6, which have been reflected in FIG. 11); however, this logic automatically adapts to the particular input DTD that is dynamically provided at run time, creating the XML bounding file to use that DTD's tags in the proper locations within the bounding language syntax.

The manner in which the editor is generated to enforce the restrictions in the generated XML bounding file (such as XML bounding file 800 of FIG. 8) will now be described with reference to FIG. 12. The generated editor may then be used by an end user to edit an XML file to be bounded. (Note that if the bounding DTD in a particular implementation allows additional or different editing choices, such as "action required", it will be obvious to one of ordinary skill in the art how the logic in FIG. 12 may be adapted for processing these additional or different editing choices.)

As stated earlier with reference to FIGS. 3A and 3B, embodiments of the present invention may operate with or without an actual input XML file 310 that is to be bounded. When such an input file has been provided (according to the configuration in FIG. 3B), then the logic in FIG. 12 parses the elements of that document; otherwise, the logic in FIG. 12 operates with the elements of an implied input document (such as document 500 in FIG. 5). The description of FIG. 12 refers to the actual or implied XML file as "the input XML file".

Block 1200 therefore obtains the next child element from the input XML file (e.g., the skeleton XML file 500 of FIG. 5 or the actual XML file 1300 of FIG. 13). Block 1205 checks to see if the input XML file is at the end. If so, then the user is allowed to edit an input XML file using this generated editor, as shown at Block 1295, according to the restrictions that have been programmatically determined and embodied within the editor while iterating through the logic of FIG. 12. If there are still more child elements to analyze in the input XML file, then processing continues at Block 1210. Blocks 1210–1290 compare the current child element to the restrictions of the generated XML bounding file, and thereby determine whether this current child element should be editable or hidden.

Block 1210 checks to see if this child element matches an entry in the "hidden" section of the generated XML bounding file. In preferred embodiments, this comprises comparing the name of the current child element's tag to the name specified in the child tags within the <hidden> element of the generated XML bounding file. (In embodiments using the component configuration of FIG. 3B, where tags in the generated XML bounding file may include ID attributes, this processing preferably comprises comparing the value of the current child element's ID attribute to the value specified in the child tags within the <hidden> element of the generated XML bounding file. Similarly, the processing of Block 1250 preferably uses this alternative approach with the component configuration in FIG. 3B as well. See the discussion of FIG. 16, below.) If not, then control transfers to Block 1250 to begin evaluating the current child element with reference to the "non-editable" section of the generated XML bounding file. Otherwise, when the current child is specified in the hidden section of the XML bounding file, then Block 1215 gets the next tag, specifying a particular element to be hidden, from the child's element within the input XML file. Block 1220 checks to see if the list of elements is at the end. If so, then control transfers to Block 1250, and if not, processing continues at Block 1225, where a test is made to see if this current element from the input XML file is specified in the child's tag within the generated XML bounding file (indicating that the element is to be hidden).

If this element is to be hidden (i.e., the test in Block 1225 has a positive result), then at Block 1230, provision is made for not displaying this element as a field to the end user for editing. Preferably, this comprises omitting generation of any text or other reference for this element from the editor panels. Control then returns to Block 1215 to get the next element from the input XML file.

When the test in Block 1225 has a negative result, then this element can be displayed to the user, and thus Block 1235 preferably generates text or other representations of this element for inclusion on a GUI editor panel before returning control to Block 1215.

Block 1250 is reached when the current child element from the input XML file has been fully analyzed with reference to the <hidden> element of the generated XML bounding file, and begins the analysis of this current tag with reference to the <non-editable> element. Block 1250 therefore checks to see if this current child element matches an entry in the "non-editable" section of the generated XML bounding file. In preferred embodiments, this comprises comparing the name of the current child element's tag to the name specified in the child tags within the <non-editable> element of the generated XML bounding file. (Note that the logic in FIG. 12 allows a particular child element from the input XML file to have some elements that are hidden and some elements that are non-editable.) If this child element is not identified in the non-editable section (i.e, the test in Block 1250 has a negative result), then analysis of this current child element is complete and control transfers to Block 1290.

Otherwise, when the current child element is specified in the non-editable section (i.e, the test in Block 1250 has a positive result), then Block 1255 gets the next element (which in this case specifies a particular element as being non-editable) from the child element within the input XML file. Block 1260 checks to see if the list of elements is at the end. (Note that the list of child elements is processed anew in the logic of Blocks 1250–1275, and thus each element processed in Blocks 1210–1235 is processed again, using the logic of FIG. 12.) If so, then control transfers to Block 1290, and if not, processing continues at Block 1265, where a test is made to see if this current element from the input XML file is specified in the child element's tag within the generated XML bounding file (indicating that the element is non-editable).

If this element cannot be edited (i.e., the test in Block 1265 has a positive result), then at Block 1270, this current child element is preferably displayed using some type of non-editable GUI control (such as that exemplified by the shaded field 920 in FIG. 9A). Control then returns to Block 1255 to get the next element from the input XML file.

When the test in Block 1265 has a negative result, then this element can be edited by the user, and thus Block 1275 preferably displays this element using some type of editable GUI control (such as the text entry fields shown at 930 in FIG. 9A) before returning control to Block 1255.

Figure 12:
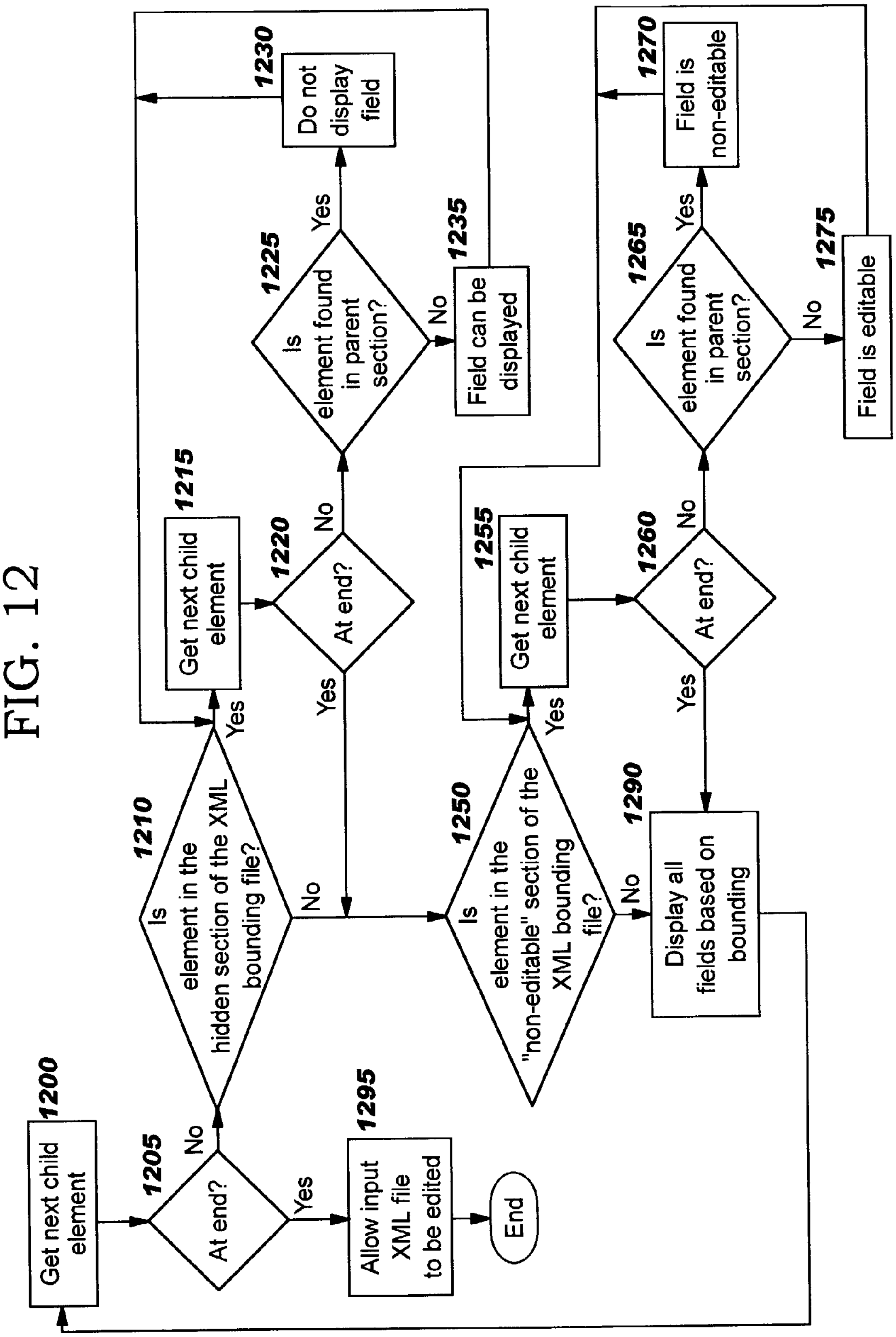

With reference to the (skeleton) input XML file 500 of FIG. 5 and the generated XML bounding file 800 of FIG. 8, the initial pass through the processing of FIG. 12 first obtains the "<header>" child element 515 at Block 1200, and checks (at Block 1210) to see if this element is in the <hidden> element 820. Since it is not, control reaches Block 1250, which checks to see if the <header> element is found in the <non-editable> element 810. Since it is found there, Block 1255 obtains the child <font> element 520, and Block 1265 tests whether this child is also found in the <non-editable> element 810. This test has a positive result, and therefore Block 1270 marks the <font> element 520 as non-editable. Block 1255 then obtains the <header> element's next child, <bg-color> 525, and Block 1265 checks to see if this child is also present at 810. Since it is not, the <bg-color> element 525 will be marked as editable by Block 1275.

Upon reaching Block 1290, analysis of this current child element from the input XML file, regarding whether the elements of this child element are hidden and/or non-editable, is complete. Control then returns to Block 1200, where the next child element from the input XML file will be retrieved for processing. (With reference to processing the example input XML file in FIG. 5, Block 1200 then obtains the <body> element 530.) Note that the logic in FIG. 12 depicts processing for elements with children at a single depth of nesting; it will be obvious to those of ordinary skill in the art how this logic can be modified for recursion, when child elements are nested more than one level deep.

Once control reaches Block 1295, the generated XML bounding file has been applied to the entire contents of the input XML file, determining how the user should be allowed to edit the input file. Block 1295 therefore allows the editing to proceed, as stated earlier, using the generated GUI editor. This generated GUI editor enforces the restrictions learned from the generated XML bounding file by iterating through FIG. 12, and displays only those elements which are not marked as hidden, and allows editing only of those elements which are not marked as non-editable.

In preferred embodiments, the generated GUI editor adapts dynamically to the XML bounding file that is supplied as its input. Thus, a single generated GUI editor may be used with a plurality of XML bounding files. In alternative embodiments, the GUI editor may be generated such that it implements the restrictions of a single XML bounding file. While this alternative embodiment achieves advantageous results in that it provides a "customized" XML editor without requiring input-file-specific code to be written manually by developers, it has a drawback of not allowing flexible updates via simply editing (or regenerating) the XML bounding file. (Note also that this alternative embodiment does not require the XML bounding file or bounding DTD as input to the generated editor, because the editor was generated to enforce their restrictions.)

Returning now to the configuration of components shown in FIG. 3B, a finer level of editing restrictions can be selected by the developer if an actual example 310 of an XML file to be bounded is provided as input to the meta editor 320. The meta editor 320 functions somewhat differently in this case, according to embodiments of the present invention. For example, rather than allowing the developer to restrict editing operations at a per-tag or "global document" level, as described above with reference to meta editor 600 of FIG. 6, the developer can now specify instance-related restrictions that will be reflected in the XML bounding file 340' (and also in the bounding DTD 330'), and the generated editor 350' will now enforce these more detailed restrictions. FIG. 13 therefore provides a sample XML file 1300 which is a filled-in version of the skeleton in FIG. 5 (which, as with skeleton XML file 500 of FIG. 5, adheres to DTD 400 of FIG. 4). In sample XML file 1300, for example, the <font> and <bg-color> elements have been given actual values, and the "src" attribute of the <image> tag also has an actual value.

Figure 14:
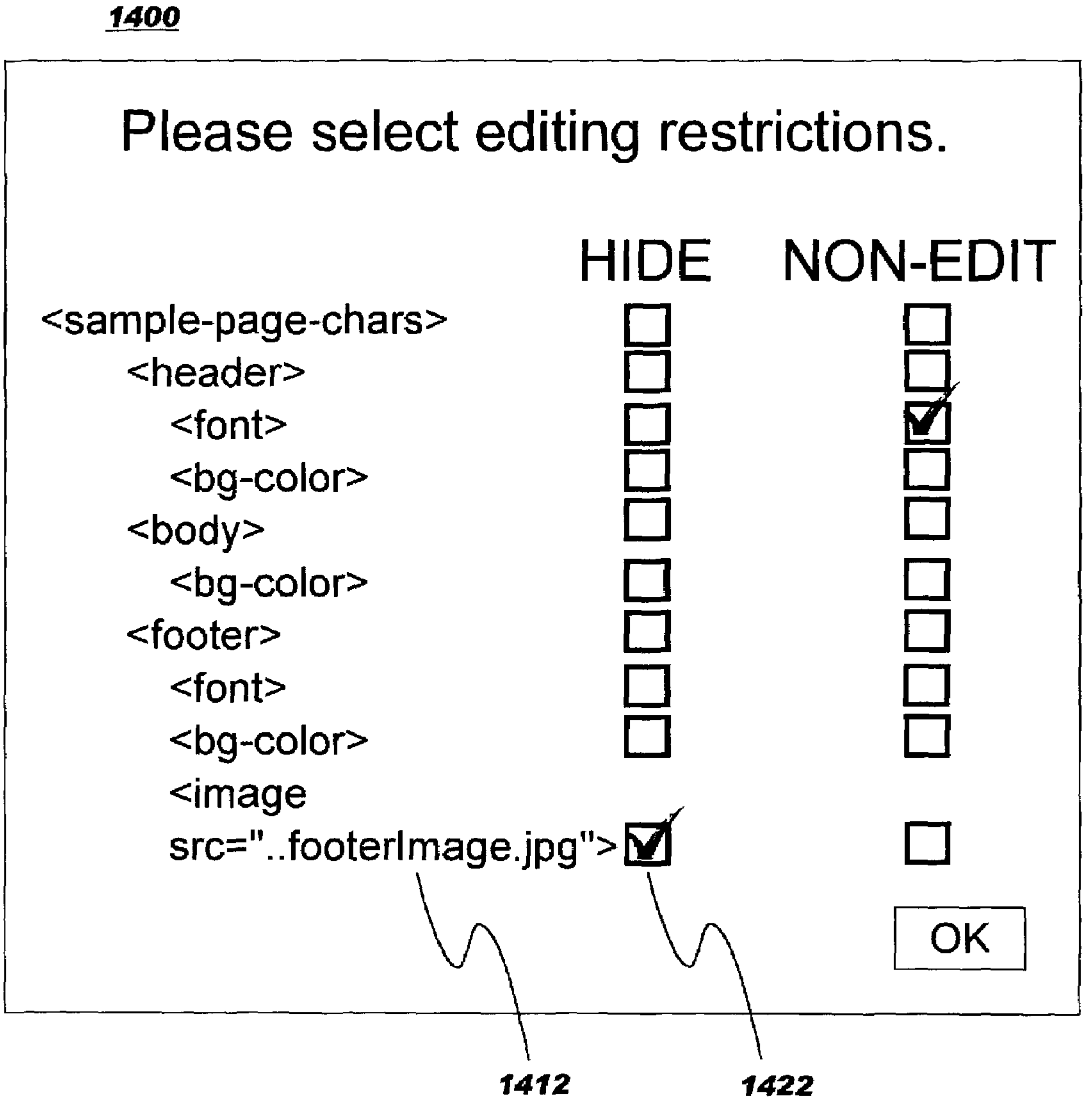
FIG. 14 shows how the meta editor illustrated in FIG. 6 might be changed when used in the component configuration illustrated in FIG. 3B.

FIG. 14 shows how the meta editor panel illustrated in FIG. 6 might be changed when the sample XML file 1300 is provided as an input file. Having detected the value shown at 1322 for the "src" attribute on <image> element 1320, the meta editor then displays this dynamically-detected value to the developer (see reference number 1412), allowing him to select (in this example) that the <image> element within the <footer> is to be hidden or non-editable only if it has the value shown at 1412. This feature may be especially beneficial when the input DTD allows many occurrences of a particular element, allowing the developer to select certain instances of those elements for restricted editing. (Refer also to the discussion of the "id" attribute of the <servlet> tag in the related invention, where this instance-specific approach was used for specifying editing restrictions on higher-level elements, i.e., elements which are not child elements. In particular, refer to the discussions of FIGS. 5–7 therein.)

Suppose the developer selects the "hide" choice for the value shown at 1412, as indicated by the check box at 1422. To support this type of instance-specific restrictions, the meta editor generates additional information in the bounding DTD 330'. See the example bounding DTD 1500 in FIG. 15. In particular, this bounding DTD 1500 now includes an attribute list definition 1560 for the "src" attribute of the image element that is defined at 750. (Alternatively, this type of attribute list definition might be generated when using the approach described above with reference to FIG. 3A to create bounding file 700, even though it is not used in corresponding XML bounding file 800.) The XML bounding file 1600 of FIG. 16 now specifies instance value 1322/1422 on the <image . . . /> tag; see reference number 1630.

In alternative embodiments, the bounding DTD may provide additional or different types of controls on the user's editing capabilities. That is, while the bounding DTD in FIG. 7 allows the developer to restrict, on a per-tag level, whether tags can be hidden or edited, it may be desirable to provide a meta editor that offers developers other approaches. Thus, the language defined by the bounding DTD in FIG. 7 is provided by way of illustration, but not of limitation. Once the techniques disclosed herein are known, those of skill in the art may use these techniques for providing meta editors that support other types of editing restrictions.

As has been demonstrated, the present invention provides a number of advantages, including allowing users to have a way to edit an XML file without necessarily having any XML knowledge; allowing developers to provide restrictions on the user's editing capabilities by (for example) specifying selected elements that are to be hidden from the user and/or that the user is to be prevented from editing, and then programmatically generating components to enforce those restrictions; and reducing the user's risk of error, thereby limiting the possibility of users making their environment unstable. It may be advantageous, in some implementations, to incorporate the teachings herein into the features of a toolkit.

While preferred embodiments of the present invention have been described, additional variations and modifications in those embodiments may occur to those skilled in the art once they learn of the basic inventive concepts. The techniques disclosed herein are based partially upon certain predefined characteristics of the notations being processed. It will be obvious to one of ordinary skill in the art that the inventive concepts disclosed herein may be adapted to changes in the notations, should they occur. Furthermore, while preferred embodiments are described with reference to a DTD, this is intended to encompass analogous types of structured markup language definition documents. Therefore, it is intended that the appended claims shall be construed to include both the preferred embodiments and all such variations and modifications as fall within the spirit and scope of the invention.

What is claimed is:

1. A software-implemented method of generating components to control manipulation of structured document content, comprising steps of:

determining, from a provided structured markup language definition document, allowable syntax for structured documents adhering to the structured markup language definition document;

displaying, to a first user, (1) the determined syntax and, (2) for each element of the determined syntax, at least one selectable editing restriction that is then selectable, by the first user, to thereby indicate a restriction on how that element can subsequently be edited when that element appears in particular one of the structured documents that adheres to the structured markup language definition document; and generating at least one component to enforce each indicated editing restriction when one or more other users attempt to edit the particular one of the structured documents.

2. The method according to claim 1, further comprising the step of selecting, by the first user, at least one of the selectable editing restrictions, prior to operation of the generating step.

3. The method according to claim 1, wherein the structured markup language definition document is a Document Type Definition ("DTD") document.

4. The method according to claim 1, wherein the particular structured document is encoded in Extensible Markup Language ("XML").

5. The method according to claim 1, wherein the at least one generated component comprises a second structured markup language definition document that contains each of the elements of the determined syntax from the provided structured markup language definition document and an element for each of the selectable editing restrictions, thereby defining a bounding language using the determined syntax and the selectable editing restrictions.

6. The method according to claim 1, wherein:

the particular one is encoded in a first structured markup language and adheres to a structure that is defined in the provided structured markup language definition document; and the at least one generated component comprises a bounding document, encoded in the first structured markup language, that specifies each editing restriction selected by the first user.

7. The method according to claim 6, wherein:

a first of the at least one generated components comprises the a second structured markup language definition document that contains each of the elements of the determined syntax from the provided structured markup language definition document and an element for each of the selectable editing restrictions, thereby defining a bounding language using the determined syntax and the selectable editing restrictions; and a second of the at least one generated components comprises bounding document, the bounding document adhering to the bounding language defined in the second structured markup language definition document.

8. The method according to claim 1, wherein the at least one generated component comprises an editing capability for the other users to use when editing the particular one, the editing capability being adapted for constraining editing of the particular one according to each editing restriction selected by the first user.

9. The method according to claim 8, further comprising the step of editing, by one of the other users, the particular one, using the editing capability, wherein the editing capability operates to constrain the editing according to each selected editing restriction.

10. The method according to claim 1, wherein a first of the at least one generated components comprises a second structured markup language definition document that contains each of the elements of the determined syntax from the provided structured markup language definition document and an element for each of the selectable editing restrictions, thereby defining a bounding language using the determined syntax and the selectable editing restrictions;

a second of the at least one generated components comprises a bounding document, encoded in a structured markup language, that specifies each editing restriction selected by the first user using the bounding language; and a third of the at least one generated components comprises an editing capability that enforces each editing restriction specified in the bounding document when the other users attempt to edit the particular one.

11. A system for generating components to control manipulation of structured document content, comprising:

a determining module for determining, from a provided structured markup language definition document, allowable syntax for structured documents adhering to the structured markup language definition document;

a displaying module for displaying, to a first user, (1) the determined syntax and, (2) for each element of the determined syntax, at least one selectable editing restriction that is then selectable, by the first user, to thereby indicate a restriction on how that element can subsequently be edited when that element appears in a particular one of the structured documents that adheres to the structured markup language definition document; and a generating module for generating at least one component to enforce each indicated editing restriction when one or more other users attempt to edit the particular one of the structured documents.

12. The system according to claim 11, further comprising a selecting module for selecting, by the first user, at least one of the selectable editing restrictions, prior to operation of the generating module.

13. The system according to claim 11, wherein the structured markup language definition document is a Document Type Definition ("DTD") document.

14. The system according to claim 11, wherein the particular structured document is encoded in Extensible Markup Language ("XML").

15. The system according to claim 11, wherein the at least one generated component comprises a second structured markup language definition document that contains each of the elements of the determined syntax from the provided structured markup language definition document and an element for each of the selectable editing restrictions, thereby defining a bounding language using the determined syntax and the selectable editing restrictions.

16. The system according to claim 11, wherein:

the particular one is encoded in a first structured markup language and adheres to a structure that is defined in the provided structured markup language definition document; and the at least one generated component comprises a bounding document, encoded in the first structured markup language, that specifies each editing restriction selected by the first user.

17. The system according to claim 16, wherein:

a first of the at least one generated components comprises a second structured markup language definition document that contains each of the elements of the determined syntax from the provided structured markup language definition document and an element for each of the selectable editing restrictions, thereby defining a bounding language using the determined syntax and the selectable editing restrictions; and a second of the at least one generated components comprises the bounding document, the bounding document adhering to the bounding language defined in the second structured markup language definition document.

18. The system according to claim 11, wherein the at least one generated component comprises an editing capability for the other users to use when editing the particular one, the editing capability being adapted for constraining editing of the particular one according to each editing restriction selected by the first user.

19. The system according to claim 18, further comprising an editing module adapted for editing, by one of the other users, the particular one, using the editing capability, wherein the editing capability operates to constrain the editing according to each selected editing restriction.

20. The system according to claim 11, wherein:

a first of the at least one generated components comprises a second structured markup language definition document that contains each of the elements of the determined syntax from the provided structured markup language definition document and an element for each of the selectable editing restrictions, thereby defining a bounding language using the determined syntax and the selectable editing restrictions;

a second of the at least one generated components comprises a bounding document, encoded in a structured markup language, that specifies each editing restriction selected by the first user, using the bounding language; and a third of the at least one generated components comprises an editing capability for the other users to use when editing the particular one, wherein the editing capability enforces each editing restriction specified in the bounding document.

21. A computer program product for generating components to control manipulation of structured document content, the computer program product embodied on one or more computer-readable media and comprising:

computer-readable program code for determining, from a provided structured markup language definition document, allowable syntax for structured documents adhering to the structured markup language definition document;

computer-readable program code for displaying, to a first user, (1) the determined syntax and, (2) for each element of the determined syntax, at least one selectable editing restriction that is then selectable, by the first user, to thereby indicate a restriction on how that element can subsequently be edited when that element appears in a particular one of the structured documents that adheres to the structured markup language definition document; and computer-readable program code for generating at least one component to enforce each indicated editing restriction when one or more other users attempt to edit the particular one of the structured documents.

22. The computer program product according to claim 21, further comprising computer-readable program code for selecting, by the first user, at least one of the selectable editing restrictions, prior to operation of the computer-readable program code for generating.

23. The computer program product according to claim 21, wherein the structured markup language definition document is a Document Type Definition ("DTD") document.

24. The computer program product according to claim 21, wherein the particular structured document is encoded in Extensible Markup Language ("XML").

25. The computer program product according to claim 21, wherein the at least one generated component comprises a second structured markup language definition document that contains each of the elements of the determined syntax from the provided structured markup language definition document and an element for each of the selectable editing restrictions, thereby defining a bounding language using the determined syntax and the selectable editing restrictions.

26. The computer program product according to claim 21, wherein:

the particular one is encoded in a first structured markup language and adheres to a structure that is defined in the provided structured markup language definition document; and the at least one generated component comprises a bounding document, encoded in the first structured markup language, that specifies each editing restriction selected by the first user.

27. The computer program product according to claim 26, wherein:

a first of the at least one generated components comprises a second structured markup language definition document that contains each of the elements of the determined syntax from the provided structured markup language definition document and an element for each of the selectable editing restrictions, thereby defining a bounding language using the determined syntax and the selectable editing restrictions; and a second of the at least one generated components comprises the bounding document, the bounding document adhering to the bounding language defined in the second structured markup language definition document.

28. The computer program product according to claim 21, wherein the at least one generated component comprises an editing capability for the other users to use when editing the particular one, the editing capability being adapted for constraining editing of the particular one according to each editing restriction selected by the first user.

29. The computer program product according to claim 28, further comprising computer-readable program code for editing, by one of the other users, the particular one, using the editing capability, wherein the editing capability operates to constrain the editing according to each selected editing restriction.

30. The computer program product according to claim 21, wherein:

a first of the at least one generated components comprises a second structured markup language definition document that contains each of the elements of the determined syntax from the provided structured markup language definition document and an element for each of the selectable editing restrictions, thereby defining a bounding language using the determined syntax and the selectable editing restrictions;

a second of the at least one generated components comprises a bounding document, encoded in a structured markup language, that specifies each editing restriction selected by the first user, using the bounding language; and a third of the at least one generated components comprises an editing capability for the other users to use when editing the particular one, wherein the editing capability enforces each editing restriction specified in the bounding document.

31. A software-implemented method of enforcing restrictions on how users can edit structured documents, comprising:

programmatically generating a bounding file that specifies restrictions on how a structured document can be edited, wherein the bounding file adheres to a bounding language that is defined in a second structured markup language definition document and specifies a user's selections from allowable restrictions on how contents of the structured document can be manipulated wherein:

the structured document adheres to a first structured markup language definition document; and the second structured markup language definition document contains an element for each element specified in the first structured markup language definition document and an element for each of the allowable restrictions, thereby defining the bounding language using the determined syntax and the selected restrictions; and using the generated bounding file to enforce the selected restrictions on how the structured document can be manipulated.

32. The method according to claim 31, further comprising programmatically generating an editing capability that enforces the selected restrictions on how the structured document can be manipulated, wherein the editing capability uses the generated bounding file to enforce the selected restrictions.

* * * * *